(No Model.)
C. H. GOEBEL.
UNDERGROUND CONDUIT FOR ELECTRIC WIRES.
No. 290,415. Patented Dec. 18, 1883.
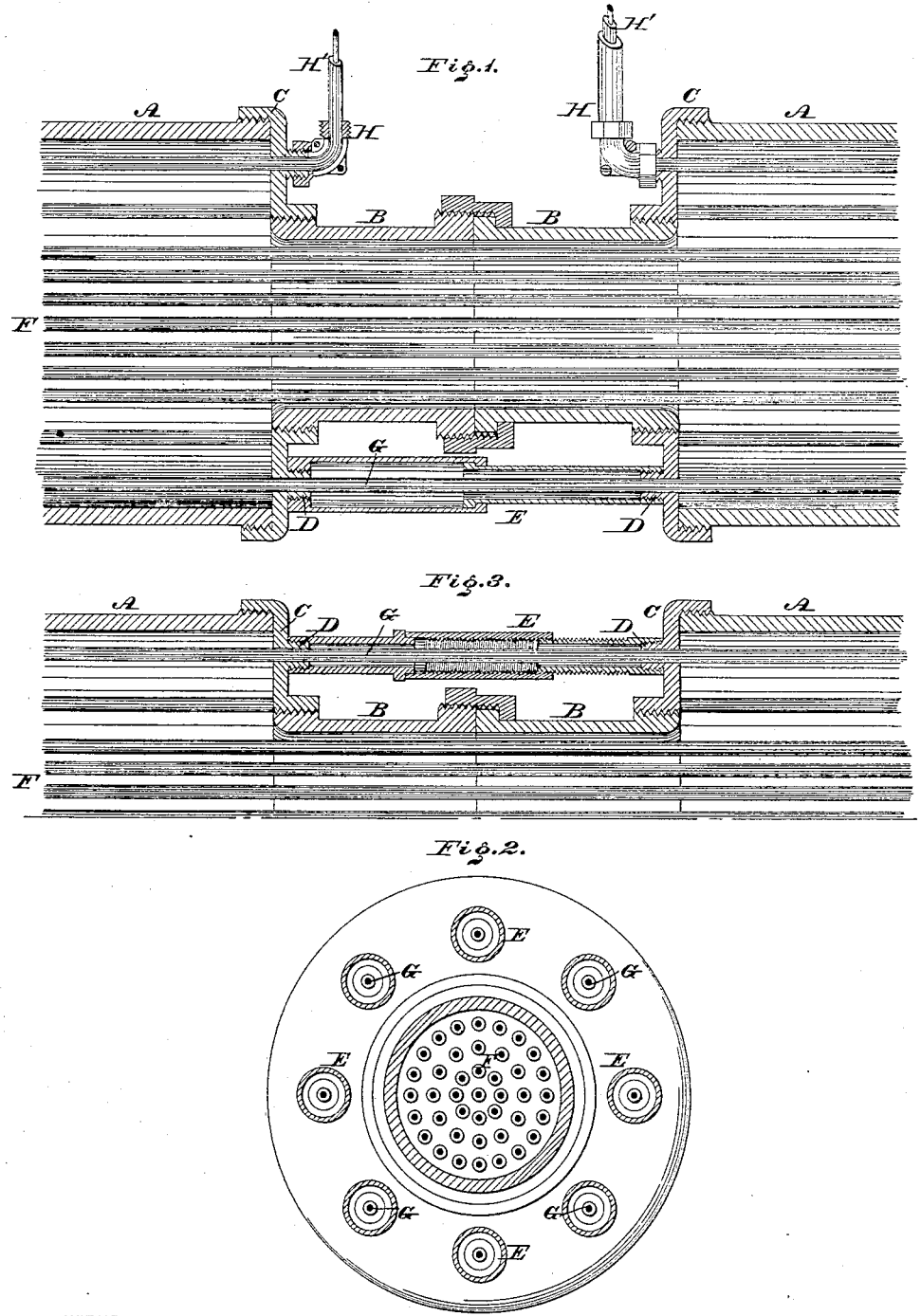

UNITED STATES PATENT OFFICE.

CHRISTIAN H. GOEBEL, OF PHILADELPHIA, PA., ASSIGNOR TO THE AMERICAN SECTIONAL ELECTRIC UNDERGROUND COMPANY, OF NEW JERSEY.

UNDERGROUND CONDUIT FOR ELECTRIC WIRES.

SPECIFICATION forming part of Letters Patent No. 290,415, dated December 18, 1883.

Application filed July 8, 1882. Renewed October 31, 1883. (No model.)

*To all whom it may concern:*

Be it known that I, CHRISTIAN H. GOEBEL, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1 is a longitudinal section of the conduit embodying my invention. Fig. 2 is an end view thereof. Fig. 3 is a longitudinal section of a modification thereof.

Similar letters of reference indicate corresponding parts in the several figures.

My invention consists of an underground conduit for electric wires provided with means, substantially as hereinafter described, whereby the wires may be uncovered for the purpose of making lateral connections.

Referring to the drawings, A A represent two tubes, and B represents tubes of less diameter, coupled together and connecting the tubes A A. The ends of the tubes A have screwed or otherwise connected with them caps C of the form of annuli, to the inner walls of which the tubes B are screwed or otherwise attached, the tubes A A B thus being in communication and forming continuations one of the other. On the outer faces of the caps C are nipples D, which are secured to or formed with said caps, and communicate with the interior of the tubes A A by means of openings in the caps, and to coincident nipples on opposite caps are attached sectional wire-receiving pipes E, which thus form continuations of the tubes A A outside of the tubes B. In Fig. 1 the pipes E are telescopic and formed of two lengths, one sliding freely within the other; and in Fig. 3 the sections are telescopic and the contiguous faces threaded, and other forms of connection may be adopted, the object in either case being to connect the sections of each pipe with each other and with the respective nipples of the opposite caps, and thus inclose the wires passed through them, and by proper rotation or movement of the sections to separate them and uncover the wires. The wires F, that are passed through the tubes A A, are run to remote points—station to station, &c.—and the wires G, that are passed through the pipes E, may be employed in like manner; but when it is desired to make lateral connections, the proper sections of the pipes E are unscrewed, thus uncovering the wires G, which are then cut at the proper place, and the sections of the pipes disconnected from the nipples D. Branch pipes H are now attached to said nipples D, the ends of the severed wires being passed through them, and connections may be made with the ends of the wires, as at H', for use of the latter in houses, on the sidewalk, in the street, or elsewhere.

Having thus described my invention, what I claim as new, and desire to secure by Letters Patent, is—

1. A wire-receiving tube, in combination with a detachably-connected wire-receiving tube of less diameter, the former having end caps provided with openings, as described, through which wires may be passed outside of the latter, substantially as and for the purpose set forth.

2. A pair of wire-receiving tubes, in combination with detachable end caps having openings for the passage of wire, and an intervening wire-receiving tube of less diameter, consisting of sections united by a collar, all of said parts being secured together by screw-threads, substantially as set forth.

3. A tube, in combination with an end cap provided with nipples, and removable sectional pipes attached to said nipples, the pipe-sections being separable, substantially as set forth.

CHRISTIAN H. GOEBEL.

Witnesses:
JOHN A. WIEDERSHEIM,
JOHN H. CHATFIELD.